March 13, 1956  W. B. NOBLE ET AL  2,737,710
METHOD OF MAKING WELDED JOINTS
Filed Sept. 4, 1951
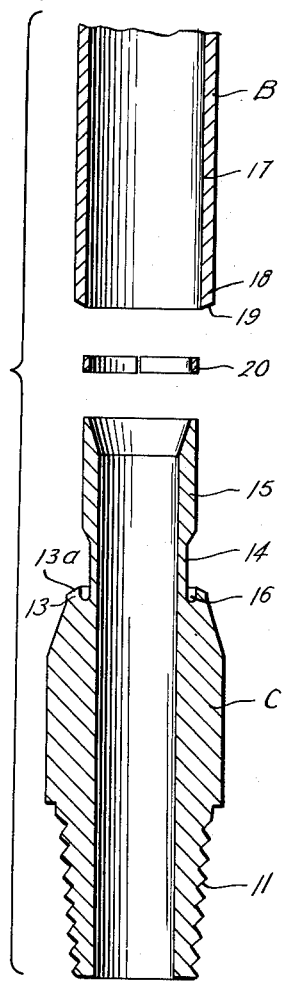
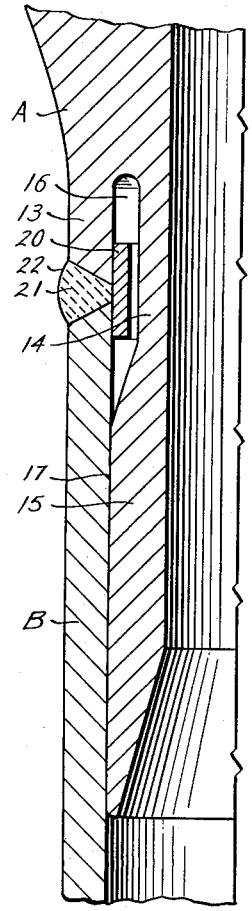
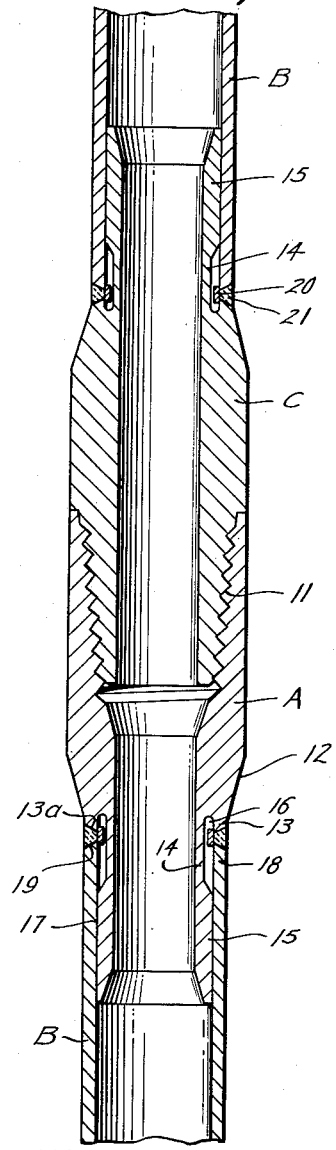
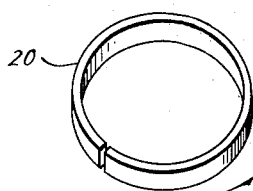
Wiley B. Noble
Ford T. Evans
Charles C. Goolsbee
INVENTORS
BY
ATTORNEYS

United States Patent Office 2,737,710
Patented Mar. 13, 1956

2,737,710

METHOD OF MAKING WELDED JOINTS

Wiley B. Noble, Ford T. Evans and Charles C. Goolsbee, Houston, Tex., assignors to Reed Roller Bit Company, Houston, Tex., a corporation of Texas Application September 4, 1951, Serial No. 245,068

5 Claims. (Cl. 29—447)

This invention relates to new and useful improvements in methods of making welded joints.

The invention is particularly adapted for use in welding drill pipe to a tool joint and the main object of the invention is to provide an improved method of welding the joint to the pipe by either a manual or submerged arc welding operation.

An important object of the invention is to provide an extension on one of the members to be welded together, which extension is engageable within the bore of the other member and which functions not only to align the members but after the weld is complete functions to reinforce the weld connection.

Another object is to provide an extension on one of the members engageable within the bore of the other member to not only reinforce the weld connection but also to seal the internal surface of said connection.

A still further object is to arrange the extension on one of the members in a manner to permit the introduction of the required back up material at the weld line and to confine said back up material after the welded connection is complete, whereby finish of the internal surface of the weld is not necessary after the operation has been completed.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is an exploded view illustrating a tool joint and drill pipe prior to the time that these parts are brought together preparatory to the welding operation, Figure 2 is an enlarged view illustrating the weld between the parts, Figure 3 is a sectional view of a tool joint welded to the pipe with the weld connections being complete, and Figure 4 is an isometric view of the split back up ring which is employed in carrying out the method.

In the drawings the letter A designates a tool joint having the usual threaded box 11 at one end thereof. An external tapered shoulder 12 is formed on the joint, and projecting from this shoulder is an annular ring 13 which is made integral with the joint body. Projecting downwardly from the joint is a tubular extension 14 also integral with the joint body, and it is preferable that the external surface 15 of the lower portion of the extension is enlarged as is clearly shown in Figure 1. An annular space 16 is provided between the extension 14 and the annular projection 13. The lower end of the annular projection is beveled or inclined as indicated at 13a.

The drill pipe B which is to be attached to the tool joint has an axial bore 17 which is of substantially the same diameter as the external diameter 15 of the lower portion of the tubular extension so that these parts have a close sliding fit. In actual practice, that end of the bore 17 of the pipe which receives the tubular extension of the tool joint may be honed to proper diameter whereby the surface 15 of the extension has a close fit therein. The end 18 of the drill pipe B is preferably beveled as indicated at 19 and is adapted to be located adjacent the beveled or reduced end 13a of the annular projection 13 on the tool joint. Thus, when the extension is engaged within the bore of the pipe, said extension functions to axially align the end 18 of the pipe with the annular projection 13 of the joint.

It is desirable that the pipe B have a shrink fit upon the extension 14 and to accomplish the shrink fit connection the pipe end is heated to a suitable temperature, which has been found to be about 700° Fahrenheit. The extension is then introduced into the bore 17 of the heated pipe end and upon cooling the pipe and extension will be firmly connected. It is noted that in initially connecting the pipe and extension the end 18 of the pipe is spaced from the end of the projection 13 on the tool joint, as illustrated in Figure 2.

Before the extension of the tool joint A is engaged with the bore of the pipe, a split back up ring 20 of suitable material is disposed within the space 16 which is provided between the annular projection 13 and the extension 14, and this ring may have a sufficient resiliency to maintain by frictional contact a proper position with respect to the annular projection 13. Thus, when the tool joint A and drill pipe B are brought to the position shown in Figure 2 with the end of the pipe spaced from the end of the annular projection 13, the back up ring 20 will span the space between the parts.

After the parts are positioned as shown in Figure 2, the pipe end and the annular projection are preheated to about 400° to 500° Fahrenheit. The weld 21 is then run either manually or by submerged arc method to connect the pipe end with the projection 13. After the welding operation is complete the weld flash indicated at 22 is machined off or removed in some suitable manner and the connection is complete. Not only does the extension 14 provide for an alignment of the parts during the welding operation but also said extension functions to reinforce the connection beyond the weld 21 at a point where failure might occur; in addition the extension seals the interior of the weld against contact with the fluid within the bore of the joint and pipe and eliminates the necessity of finishing off the interior of the weld.

A completed tool joint assembly is illustrated in Figure 3 wherein the joint A is welded to pipe B. The complementary pin section of the tool joint indicated at C is also welded to a section of pipe B, and thus it is evident that the particular method is applicable to connecting either section of a tool joint to the pipe. Although illustrated herein as applied to securing a tool joint with a drill pipe, it is evident that the method may be applied for welding any two members to each other.

The foregoing disclosure and description of the invention is illustrative and explanatory thereof and various changes in the size, shape and materials, as well as in the details of the illustrated construction may be made, without departing from the spirit of the invention.

Having described the invention, we claim:

1. The method of connecting a tubular member with a second member wherein the latter has an annular projection of substantially the same cross-sectional thickness as the tubular member and wherein the adjacent ends of the tubular member and said projection are to be welded to each other, and also wherein a cylindrical extension extends from the second member beyond said annular projection and said annular projection encircles and is concentrically disposed with relation to said cylindrical extension, said method including the steps of, forming the bore of the tubular member of substantially the same diameter as the external surface of the extension, shrink fitting the extension into the bore of the tubular member to initially connect the members with the end of the tubular member in spaced relationship to the annular projection, and thereafter welding the adjacent ends of the tubular member and projection to each other.

2. The method as set forth in claim 1, with the additional step of disposing a back up element in a position spanning the space between the adjacent ends of the projection and tubular member prior to the welding operation.

3. The method of connecting a tubular member with a second member wherein the latter has an annular projection of substantially the same cross-sectional thickness as the tubular member and wherein the abutting ends of the tubular member and said projection are to be welded to each other and also wherein a cylindrical extension extends from the second member beyond said annular projection and said annular projection encircles and is concentrically disposed with relation to said cylindrical extension, said method including the steps of, forming the bore of the tubular member of substantially the same diameter as the external surface of the extension, shrink fitting the extension into the bore of the tubular member to initially connect the members with the end of the tubular member in spaced relationship to the annular projection, disposing a backing element in a position to span the space between the ends of the projection and tubular member, and thereafter arc welding the abutting ends of the tubular member and projection to each other.

4. The method of connecting a tubular member with a second member wherein the latter has an annular projection of substantially the same cross-sectional thickness as the tubular member and wherein the abutting ends of the tubular member and said projection are to be welded to each other and also wherein a cylindrical extension extends from the second member beyond said annular projection and said annular projection encircles and is concentrically disposed with relation to said cylindrical extension, said method including the steps of, forming the bore of the tubular member of substantially the same diameter as the external surface of the extension, shrink fitting the extension into the bore of the tubular member to initially connect the members with the end of the tubular member in spaced relationship to the annular projection, disposing a backing element in a position to span the space between the ends of the projection and tubular member, and thereafter manually welding the abutting ends of the tubular member and projection to each other.

5. The method as set forth in claim 1, together with the additional step of removing the welding flash from the exterior surface of the projection and tubular member at the weld line.

References Cited in the file of this patent

UNITED STATES PATENTS

| | | |
|---|---|---|
| 507,974 | Crosby | Oct. 31, 1893 |
| 1,935,063 | Scott | Nov. 14, 1933 |
| 1,951,122 | Balze | Mar. 13, 1934 |
| 2,126,519 | Vogel | Aug. 9, 1938 |
| 2,256,924 | Hopkins | Sept. 23, 1941 |
| 2,366,579 | Von Ahrens | Jan. 2, 1945 |
| 2,382,098 | Robie | Aug. 14, 1945 |
| 2,412,271 | Kercher | Dec. 10, 1946 |
| 2,420,139 | Kelly | May 6, 1947 |
| 2,535,320 | Richardson | Dec. 26, 1950 |
| 2,636,753 | Griffin | Apr. 28, 1953 |